US009813760B2

(12) United States Patent
Wen (10) Patent No.: US 9,813,760 B2
(45) Date of Patent: Nov. 7, 2017

(54) MULTI-SCREEN MEDIA DELIVERY SYSTEMS AND METHODS (71) Applicant: NANYANG TECHNOLOGICAL UNIVERSITY, Singapore (SG)

(72) Inventor: Yonggang Wen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 212 days.

(21) Appl. No.: 14/439,038

(22) PCT Filed: Oct. 9, 2013

(86) PCT No.: PCT/SG2013/000435
§ 371 (c)(1),
(2) Date: Apr. 28, 2015

(87) PCT Pub. No.: WO2014/070106
PCT Pub. Date: May 8, 2014

(65) Prior Publication Data
US 2015/0341686 A1 Nov. 26, 2015

Related U.S. Application Data (60) Provisional application No. 61/720,660, filed on Oct. 31, 2012.

(51) Int. Cl.
H04N 21/436 (2011.01)
H04N 21/218 (2011.01)
(Continued)

(52) U.S. Cl.
CPC ... *H04N 21/43615* (2013.01); *G06F 9/45558* (2013.01); *G06F 9/5072* (2013.01);
(Continued)

(58) Field of Classification Search
CPC ......... H04N 21/43615; H04N 21/2181; H04N 21/8173; H04N 21/4122; H04N 21/6125;
(Continued)

(56) References Cited

U.S. PATENT DOCUMENTS 7,689,051 B2 3/2010 Mukerjee
2005/0036549 A1 2/2005 He et al.
(Continued)

FOREIGN PATENT DOCUMENTS

CN 1684495 A 10/2005
CN 1839629 A 9/2006
(Continued)

OTHER PUBLICATIONS

International Search Report dated Dec. 3, 2013 for International Patent Application No. PCT/SG2013/000435, filed Oct. 9, 2013.
(Continued)

Primary Examiner — Benjamin R Bruckart
Assistant Examiner — Aklil Tesfaye
(74) Attorney, Agent, or Firm — Merchant & Gould P.C.

(57) ABSTRACT

A system is proposed for delivering video content to display devices using a cloud computing model. A plurality of independent physical computer systems cooperate to implement a virtual computer system ("cloud") which receives media content from sources of media content, and delivers the media content selectively to video display devices. For each of a plurality of users of the virtual computer system, there is a corresponding process ("cloudclone") running on the virtual computer system which coordinates the delivery of the content to one or more of the video display devices which are associated with the corresponding user. The cloudclone includes respective components for managing the transfer of media content to each of the video display devices associated with the user. This makes possible a
(Continued)

straightforward way of migrating video sessions between the devices associated with the user, by changing the corresponding cloudclone. The cloud can also access pre-determined social relationships between the users, and use the actions of a first of the users, to control content delivered to the other user(s) with which the first user has a social relationship.

21 Claims, 8 Drawing Sheets

(51) Int. Cl.

| | | |
|---|---|---|
| *H04N 21/81* | (2011.01) | |
| *H04N 21/41* | (2011.01) | |
| *H04N 21/61* | (2011.01) | |
| *H04N 21/4788* | (2011.01) | |
| *H04N 21/258* | (2011.01) | |
| *G06F 9/50* | (2006.01) | |
| *G06F 9/455* | (2006.01) | |
| *H04L 29/08* | (2006.01) | |
| *H04L 12/18* | (2006.01) | |

(52) U.S. Cl.
CPC .......... *H04L 12/1827* (2013.01); *H04L 67/10* (2013.01); *H04N 21/2181* (2013.01); *H04N 21/25808* (2013.01); *H04N 21/4113* (2013.01); *H04N 21/4122* (2013.01); *H04N 21/4126* (2013.01); *H04N 21/4788* (2013.01); *H04N 21/6125* (2013.01); *H04N 21/6175* (2013.01); *H04N 21/812* (2013.01); *H04N 21/8173* (2013.01); *G06F 2009/4557* (2013.01)

(58) Field of Classification Search
CPC .......... H04N 21/6175; H04N 21/4113; H04N 21/812; H04N 21/4788; H04N 21/02; G06F 9/45558; G06F 9/5072; H04L 67/10; H04L 12/1827
See application file for complete search history.

(56) References Cited

U.S. PATENT DOCUMENTS

| | | | |
|---|---|---|---|
| 2009/0116550 A1 | 5/2009 | Bjontegaard | |
| 2009/0222874 A1* | 9/2009 | White | H04N 7/173 725/118 |
| 2011/0106950 A1* | 5/2011 | Schlack | G06F 11/2046 709/226 |
| 2012/0087634 A1 | 4/2012 | Lalwaney | |
| 2012/0291073 A1* | 11/2012 | Friedman | H04N 5/44582 725/62 |
| 2013/0268687 A1* | 10/2013 | Schrecker | H04W 12/06 709/229 |
| 2013/0326570 A1* | 12/2013 | Cowper | H04N 21/4725 725/109 |
| 2014/0258441 A1* | 9/2014 | L'Heureux | H04W 12/06 709/217 |

FOREIGN PATENT DOCUMENTS

| | | |
|---|---|---|
| CN | 101836453 A | 9/2010 |
| EP | 1107608 A2 | 6/2001 |
| WO | 2010/127266 A1 | 11/2010 |

OTHER PUBLICATIONS

Written Opinion of the International Searching Authority dated Dec. 3, 2013 for International Patent Application No. PCT/SG2013/000435, filed Oct. 9, 2013.
Alembik Team, "Alembik Core Engine", Published on Jun. 29, 2012 as per www.archive.org, Retrieved on Nov. 28, 2013 from the Internet: http://web.archive.org/web/20120629103613/http://alembik.sourceforge.net/core_engine.html, 7 pages.
Chun et al., "CloneCloud: Elastic Execution between Mobile Device and Cloud", EuroSys'11, Apr. 13, 2011, Salzburg, Austria, 14 pages.
Jin et al., "CoDaaS: An Experimental Cloud-Centric Content Delivery Platform for User-Generated Contents", International Conference on Computing, Networking and Communications (ICNC), Feb. 2, 2012, 5 pages.
Kosta et al., "Unleashing the Power of Mobile Cloud Computing using ThinkAir.", arXiv preprint arXiv:1105.3232 (2011), May 16, 2011, 17 pages.
Shacham et al., "The Virtual Device: Expanding Wireless Communication Services through Service Discovery and Session Mobility.", Wireless and Mobile Computing, Networking and Communications, 2005 (WiMob'2005), IEEE International Conference on, vol. 4, IEEE, 2005, 10 pages.
Chinese Office Action from corresponding Chinese Patent Application No. 201280053919.6, dated Dec. 27, 2016.
Supplementary European Search Report from corresponding European Patent Application No. 13850142.4, dated Nov. 22, 2016.
Wenwu Zhu et al: "Multimedia Cloud Computing", IEEE Signal Processing Magazine, IEEE Service Center, Piscataway, NJ, US, vol. 28, No. 3, May 1, 2011 (May 1, 2011), pp. 59-69, XP011354682, ISSN: 1053-5888, DOI: 10.1109/MSP.2011.940269.

* cited by examiner

MULTI-SCREEN MEDIA DELIVERY SYSTEMS AND METHODS

This application is a National Stage Application of PCT/SG2013/00435, filed 9 Oct. 2013, which claims benefit of Ser. No. 61/720,660, filed 31 Oct. 2012 in English and which application(s) are incorporated herein by reference. To the extent appropriate, a claim of priority is made to each of the above disclosed applications.

FIELD OF THE INVENTION

The present invention relates to a system in which media content (especially video content, comprising a visual track and an audio track) is delivered to multiple devices, each having at least one screen.

BACKGROUND OF THE INVENTION

The recent emergence of multi-screen social TV is dramatically transforming the TV experience. First, the traditional "lean backward" video watching experience (i.e. passive consumption of video content) has been integrated with a "lean forward" experience, implying a deeper engagement with the content, such as a social networking experience. Second, social TV aims to offer ubiquitous services which are available at any time, on any device, at an affordable price. Thirdly, with the significant growth of media consumption across multiple screens, users may want to transfer ongoing sessions from one device to another without interruption of video streaming.

However, existing systems suffer from significant limitations. For example, with regard to the transfer of ongoing sessions from one device to another, one proposal by Apple Inc. allows a single session running on a first device to be migrated to a second device (but not for transfer in a reverse direction). Furthermore, large scale deployment of multi-screen social TV is very limited.

Advertising is one of the major ways to make revenue for the content providers (i.e., TV stations, social networks, websites, etc.). Leveraging social networks can better take advantage of the users' demographic information and target their ads appropriately. There are presently two ways to distribute advertisements over social networks:
1) Embedding online advertisements into social networking website (e.g., facebook, weibo). However, this approach does not really make use of the social relationships of each user. As a result, it cannot provide better advertising effectiveness than other online advertising methods.
2) The users deliberately share advertisements on their social network, so that their friends can view the shared advertising. However, this approach requires massive user operations (e.g., finding the URL of advertisement, creating a new page and editing it), thus degrading the user experience.

The integration of TV experience and social networking is increasingly popular nowadays. However, currently, it is not an easy task for users to share real-time TV program information over personal social networks. First, the users have to deliberately take a few photos in front of the TV screen. Then they use some graphics editing tools (e.g., Photoshop) to synthesize those images into a new one (a "synthesis image"). Finally, they login to their social networking account and post the synthesis image manually. This approach requires a lot of user operations, thus significantly degrading the user experience and limiting its adoption rate.

SUMMARY OF THE INVENTION

The present invention aims to provide new and useful systems and methods for delivery of media content. The content delivery method may be in a social context (i.e. in the context of a social network defined by social network data), potentially leading to a content-driven social fabric.

In general terms the present invention proposes a cloud computing model in which a plurality of independent physical computer systems cooperate to implement a virtual computer system ("cloud") which communicates with multiple video display devices each of which has at least one screen. The virtual computer system receives media content from one or more sources of media content, and delivers the media content selectively to the video display devices. For each of a plurality of users of the virtual computer system, there is a corresponding process (referred to in this document as a "cloudclone", which is an example of what is referred to in the literature as a "service container") running on the virtual computer system which coordinates the delivery of the content to one or more of the video display devices which are associated with the corresponding user.

The invention makes possible a multi-screen social TV system for content consumption via the use of display devices which are heterogeneous media outlets (e.g., TV screens, smart phones, tablets, laptops and computers). In this system, all those devices are connected with a powerful cloud, which has full knowledge of each user's real time sessions. The ongoing sessions on the client sides are always synchronized with the corresponding cloudclone.

In a first aspect of the invention, one or more of the users are each associated with a respective plurality of the video display devices, and, for each of those users, the corresponding cloudclone includes respective threads for managing the transfer of media content to each of the video display devices associated with the user.

Based on this concept, the invention further proposes a session migration scheme to allow users to migrate (transfer) sessions among the plurality of display devices, such as taking away an ongoing session from a TV screen to a mobile device, or vice versa.

In a second aspect of the invention, which may be used in combination with the first aspect, pre-determined relationships exist between the users, i.e. one of more of the users each have a predetermined relationship with a respective set of one or more other users (his/her "friends"). The virtual computer system is arranged, based on the actions of one of the users, to modify the content delivered to the other user(s) in the respective set.

In one example of this concept, the invention proposes a novel approach to redistribute video (such as advertisements) to users' friends over the cloud based social TV platform, by retransmitting information to the respective cloudclones of one or more of the friends. This can improve both the user experience and advertising coverage.

Furthermore, the invention proposes a novel way to collect video frames from TV programs, which will be synthesized into a new image (in gif or other picture format) to represent the playing video, and posted to a social networking website. This solution is expected to further drive the wide adoption of social TV.

BRIEF DESCRIPTION OF THE DRAWINGS

Embodiments of the invention will now be described for the sake of example only with reference to the following figures in which:

FIG. 1, which is composed of FIGS. 1(a) and (b), shows the generic framework of an embodiment of the invention;

DETAILED DESCRIPTION OF THE EMBODIMENT

1. Framework

Figure 1A:
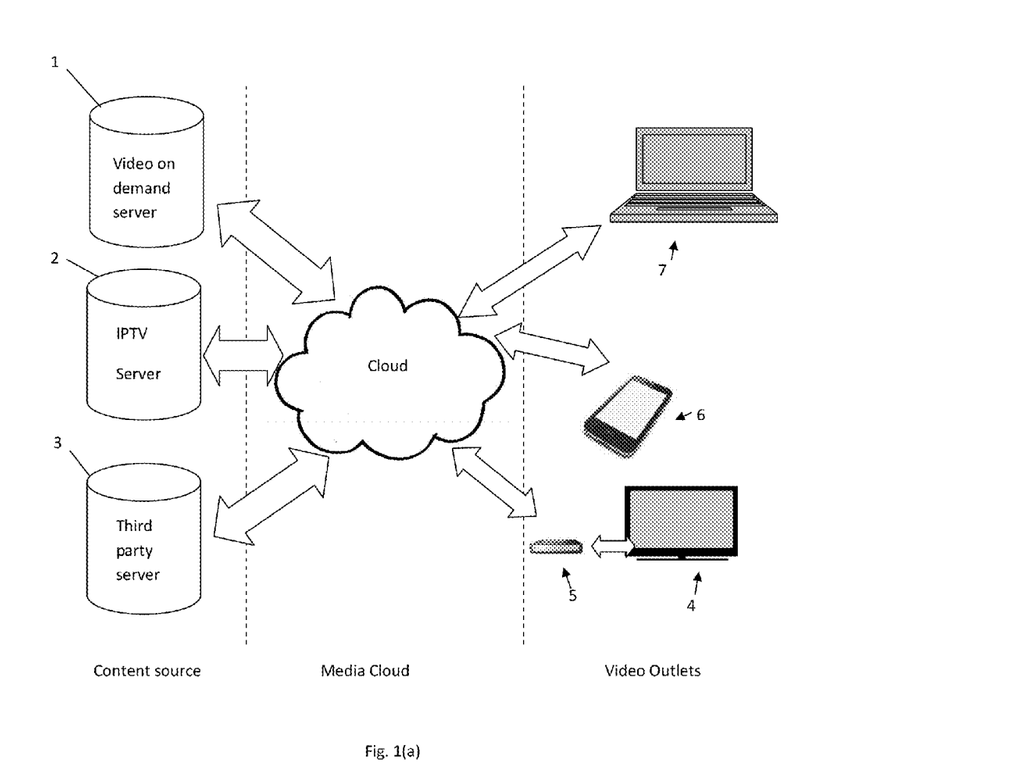

FIG. 1(a) shows the generic system framework of an embodiment of the invention which is a multi-screen cloud social TV system. The system includes three segments: one or more content sources, a media cloud, and a plurality of video display devices ("video outlets"). We now describe these segments of the system in detail.

(i) Content Sources

This section of the embodiment can include any existing source of video content, or any such sources as are proposed in the future. The content services are illustrated as including video-on-demand server(s) 1 and IPTV server(s) 2. Known content sources falling into these categories provide:

Live TV Video Streams: these include not only the most traditional live video streams from TV channels, but also the streams from any third-party live content brokers such as Hulu.

On-Demand TV Video Streams: there could be either Over-The-Top (OTT) contents from VOD distributors, managed contents for service providers, or User Generated Contents (UGCs) from Digital Video Recorder (DVR) and Personal Video Recorder (PVR).

As additionally shown in FIG. 1, the media cloud may also access further third party server(s) 3. These may include servers which implement a social network 3, and/or are Extensible Messaging and Presence Protocol (XMPP) servers. The servers 3 may additionally or alternatively include servers providing advertising content. The significance of these possibilities is discussed below.

(ii) Media Cloud

The media cloud is provided by a plurality of independent physical computer systems which cooperate to provide a single virtual computer system. Each of the plurality of independent physical computer systems typically has its own power source, and its own operating system, typically running according to its own system clock. Each of the plurality of computer systems communicates according to a pre-defined protocol with one or more others of the plurality of computer systems. Collectively the plurality of computer systems span a geographically distributed or co-located space, such that the plurality of computer systems include one or more pairs of computer systems which are located close to each other, or at least 10 kms apart, at least 100 kms apart or even 1000 km apart.

Figure 1B:
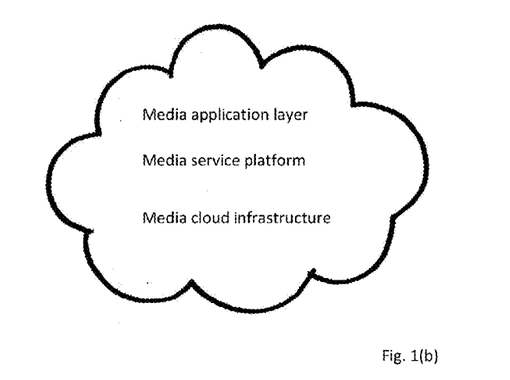

The media cloud is configured to provide the virtual computing system in the form of a layered service model, including three layers shown in FIG. 1(b):

1. A media cloud infrastructure. This provides "Infrastructure-as-a-Service". There is a resource pool powered by virtualization technology in a set of data centers. Those resources can be utilized on demand to provide elastic computation and storage capability to the upper layers.

2. A media service platform, relying upon the infrastructure provided by layer 1. The media service platform provides a "platform-as-a-service", i.e. a solution stack as a service. Specifically, a wide variety of tools, libraries and interfaces are provided by this layer. The offerings facilitate the deployment of the media cloud on resource allocation, cloudclone management, media service discovery and etc. Examples of tools which may be provide at this layer include (i) transcoding (that is, converting media content from one content protocol to another); (ii) operation of an process explained below and referred to as the "cloudclone". More generally, the services in this layer can be roughly classified into two categories: media-specific services and management-related services. Media services can be further divided into four classes, including: (i) media processing (e.g., encoding, decoding, transcoding, feature extraction, etc), (ii) content delivery (e.g., cache, prefetching, placement, streaming), (iii) media adaptation (e.g, rate adaption, rendering, retargeting, mashup, etc), and (iv) media analytics (metadata analysis, tagging, visualization, etc). Management-related services include account management, authentication, device management via cloudclone, etc.

3. A media application layer, relying upon the media service platform. The media application layer provides "software-as-a-service". That is, the media application layer is a software delivery model. It instantiates the multi-screen cloud social TV system as a service, where the software and the major associated data are hosted on the cloud, so that only a thin client is required on the client side, i.e. in the video outlets. The media application layer provides the functionality for video streaming, for chat sessions between users, and more generality for services which are visible to users. This minimizes the functional requirements of the application software installed on the video outlets (see below).

(iii) Video Outlets

The term "video outlet" refers to a video display device that a user uses for video consumption. Such a device typically has both a screen and one or more sound generators. The term is used to include any video display device which exists now or will exist in future. It is generally in the locality of a user, and so may also be referred to as a "local device". Some video devices can be viewed by multiple people at once (e.g. a family), but each video display device is associated with (e.g. registered to) a single "user". In some circumstances one of the display devices may actually be associated with a plurality of people (e.g. a device which is registered as being owned by a family or a club), and in this case the term "user" is used to encompass this plurality of people. In other words, the various video display devices in the embodiment of FIG. 1 are divided into a plurality of sub-sets (each sub-set including one or more of the video outlets), and each sub-set of video outlets is associated with a respective one of the users.

A certain user may add to the display device(s) associated with him by logging onto the virtual computer system with a new display device. Similarly, a certain user can reduce the number of display device(s) associated with him by logging one or more of those devices out from the virtual computer system.

Note that in some versions of the embodiment, a given video display device may change its association. For example, a first user may sell or lend a video display device associated with him to a second of the users, who registers it in his/her own name. Thus, the video display device has moved from the sub-set of display devices associated with the first user, to the sub-set of devices associated with a second user. In another example, a certain display device may be available for temporary use by another of multiple users, and becomes temporarily associated with a user who chooses to use it.

In today's technology, there are three types of video outlets:

TV: This refers to devices 4 which are primarily designed for passive watching of video. Increasingly TV devices are operated to function as Internet-protocol TVs (IPTV), such that a TV becomes an Internet-connected device. The connection to the media cloud can be made using a set-top box 5 or a built-in Internet connection in the TV.

Laptop/PC: Laptops and PCs 6 are Internet-connected devices having a physical keyboard to enable content entry. They typically get access to Internet to obtain the media contents from media cloud throughout Ethernet, Wifi, or some kind of Internet communication protocol.

Tablet/Smartphones 7 are mobile devices which obtain video content wirelessly from media cloud via either 3G/4G networks or Wifi.

Any combination of these may be used as the video outlets 4, 6, 7 of the present invention without being modified, except that they incorporate an application (i.e. a section of software) configured to interact with the media cloud. In the case of a TV, the application may be replaced by a TV box via which the TV communicates with one of the servers of the media cloud.

The media cloud communicates with the display devices 4, 6, 7 to deliver content to them. It presents different graphic user interfaces to different display devices.

The design of the multi-screen cloud social TV system of FIG. 1 is guided by two fundamental motivations:

to reduce the required hardware specifications of the content sources and media outlets, by offloading computing-intensive tasks into the cloud infrastructure;

to provide the best flexibility to all the stakeholders in the digital media value chain, by leveraging all three alternative cloud service models.

2. Distributed Cloudclone Architecture

This section describes an process which runs on the virtual computer system to support multi-screen service orchestration. This technique is introduced to handle the scalability challenge of maintaining all the session information across different media outlets that are associated with the same user.

The generic idea of distributed cloudclone architecture is to instantiate a personal digital clone in the cloud to manage all the session information for the video outlets associated with a single respective user.

Each cloudclone is instantiated on the virtual computer system. This is described in more detail below. The cloudclone instance will migrate in the cloud infrastructure to best serve its corresponding users. Finally, all the cloudclone instances form a logical ring, via a distributed hash table (DHT), to allow fast routing and information retrieval.

Figure 2:
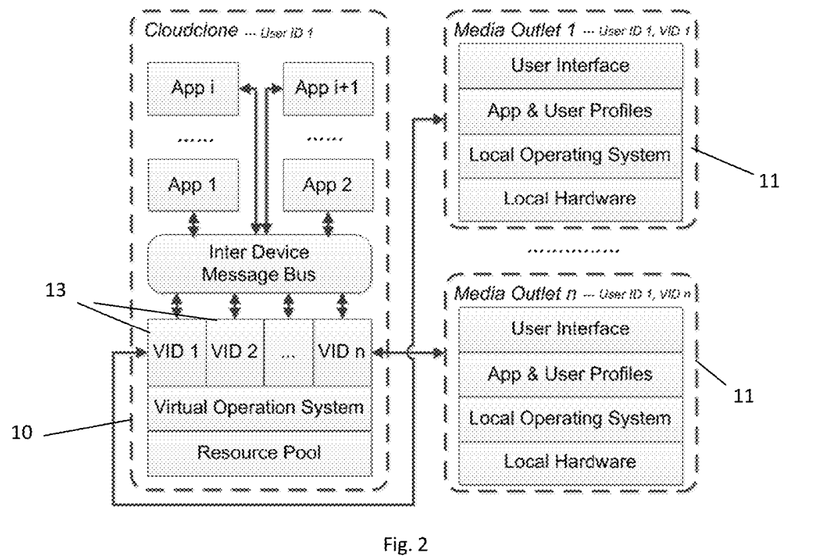
FIG. 2 shows schematically the interaction between a cloudclone instance and a number of display devices.

FIG. 2 shows the logical structure of a personal digital cloudclone instance 10, and its interaction with the media outlets associated with the respective user. The user is associated with n display devices (media outlets) 11. The cloudclone runs a list of n virtual device threads 13, which are virtual modules of the cloudclone. Each of those threads 13 is mapped to one of the participatory display devices 11. A unique virtual ID is used to identify each pair of them. These are denoted by VID 1, . . . VID n. Copies of all the active applications on the display devices are also running on the corresponding cloudclone. The profiles and status of those applications are orchestrated by the virtual device threads via an inter device message bus. As a result, the pairs with the same respective virtual ID run exactly the same applications simultaneously, and synchronize with each other of the pair once there is any user input from the client side. Notice that each user has another unique user ID, shown as User ID 1, which may be mapped into more than one of the virtual IDs.

The cloudclone 10 includes a resource pool (system resources including computing, networking and storage capabilities), and a virtual operation system (the operating system of the display device running on the virtual machine), and threads for each of the n associated display devices 11 which manage the communication between the cloudclone and the respective display devices.

Note that each of the display devices 11 comprises local hardware, which runs a local operating system. The operating system generates a graphical user interface (GUI). The display device 11 includes a user profile which consists of information pertaining to the user, and an application profile which consists of information pertaining to the specific application used by the user on the display device 11. For example, a certain user might run a social network application (APP) on his smartphone while watching TV on his TV screen. Both applications are managed by his cloudclone and embodied by a respective application running in the cloudclone. Each application is linked to the VID corresponding to the respective device.

In total there are N applications running on the n display devices 11, some of which may be applications which are simultaneously running on two or more of the display devices 11. As mentioned above, the cloudclone 10 duplicates these applications. To do this the cloudclone has modules (labeled App 1, . . . App i, App i+1, . . . App N) which duplicate the respective applications, and the inter-device message bus interfaces between the N modules which correspond to the applications, and the n modules which correspond to the devices.

Figure 3:
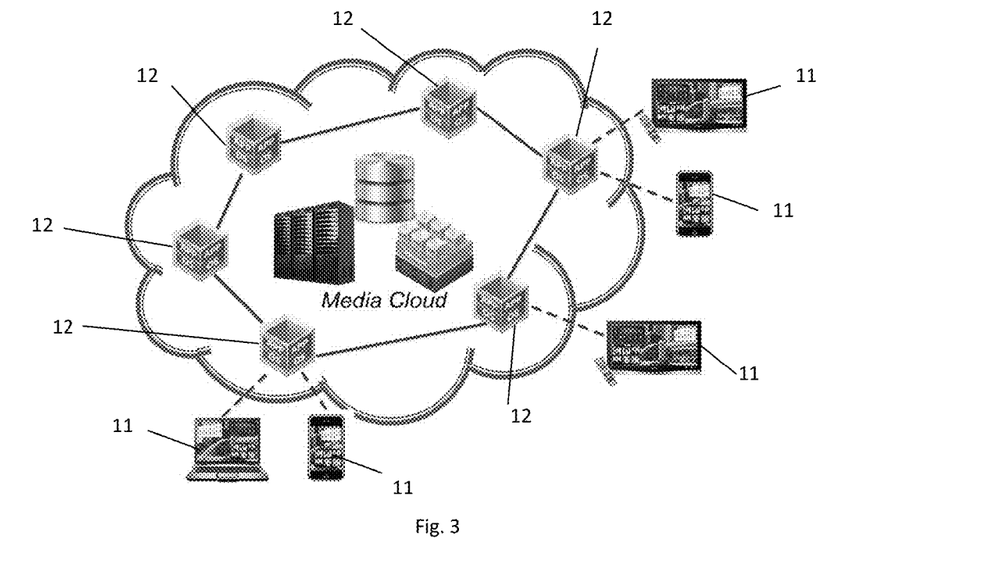
FIG. 3 shows schematically an implementation of the cloudclone instance.

FIG. 3 illustrates how the cloudclones are structured in the media cloud. A given cloudclone is implemented by a DHT ring of independent physical computer systems (servers) 12, which is a subset of all the physical computer systems which collectively form the cloud. The ring of physical server systems 12 include servers which are in direct communication with the display devices 11. This provides fast routing and information retrieval. Specifically, in the DHT key space, each cloudclone is uniquely determined by a key. As long as the key is specified, the route length (i.e. starting at any entry point on the ring, the average number of intermediate nodes that relay a request sent from the entry point to any other node on the ring) scales as O(m), where m is the total number of nodes in the DHT ring. This architecture also offers high scalability (i.e., support for at least a hundred cloudclones, at least a thousand cloudclones, or even up to millions of cloudclones), autonomy, and fault tolerance.

3. Session Migration

In this section, we describe how session migration across different media outlets works in the generic system framework of FIGS. 1-3.

3.1 Generic Concept of Session Migration

Figure 4:
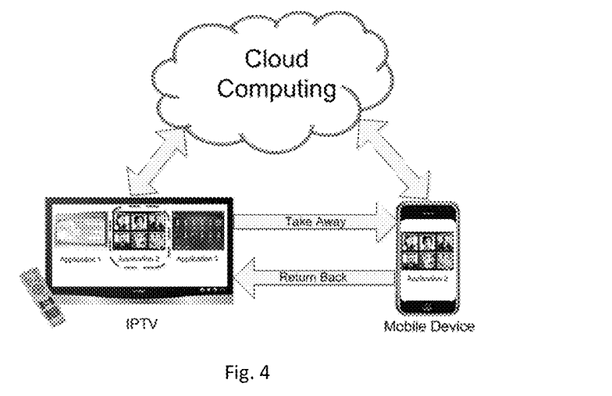
FIG. 4 illustrates the concept of the transfer of a session between multiple display devices.

Session migration refers to the feature in which individual sessions on one media outlet can seamlessly migrate to another media outlet, with the minimum human intervention, as illustrated in FIG. 4 in which a session migrates from an IPTV to a mobile display device, and vice versa. This is implemented via the media cloud with which both display devices are in communication, although the user may not be aware of that fact.

Each object displayed in a screen is considered as a session, providing the feasibility of migrating individual objects, while leaving other sessions undisturbed. The two devices involved with a migration are considered as a master device and a slave device. The master device is the one which has some ongoing sessions to be migrated to the slave device. The slave device can also return the migrated session back to the master device during the session backward migration. The former is called forward session migration and the latter is called backward session migration. For example, the IPTV in FIG. 4 is the master device, in which there are three ongoing applications; while the mobile device is the slave device. It is able to take away the session 2 from the master device, and return it back to the master device as well.

3.2 Generic Session Migration Flow

Figure 5:
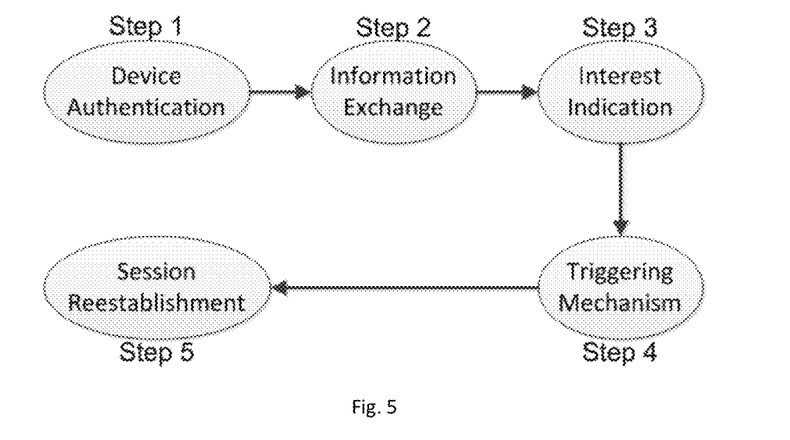
FIG. 5 illustrates the steps of a first session migration process.

FIG. 5 shows the transition diagram for forward migration. The generic flow for session migration from the master device to the slave device includes five steps:

Device Authentication: The slave device uses the same user ID as used in the master device to log in the media cloud, so that its corresponding cloudclone can be found and utilized. After the cloudclone has successfully launched the according virtual machine (i.e. the thread which is part of the cloudclone, and which is shown in FIG. 2 by a corresponding VID label; this thread might be one which is newly created, or alternatively, especially in the case that the slave device was previously logged in, it might be a pre-existing thread which is re-activated), the slave device gets the authentication from the media cloud. A simple authentication mechanism should be used. Example techniques for device authentication include, but are not limited to, direct login from the slave device with a personalized account, scanning a QR code or a color code on the master device, biometric authentication, or using other session recognition techniques.

Information Exchange: Once the connection between the cloudclone and the slave device is established, the information about the ongoing sessions running on the master device will be sent to the slave device via its virtual identity in the cloudclone. Moreover, information from the master device can be captured by the slave device through a sensory function of the slave device. For example, the slave device may take a video or photo of the screen of the master device, and extract information from that.

Interest Indication: Based on the session information, users can select one or more sessions to be migrated from the master device to the slave one, according to their personal interests. Intuitive human-machine interfaces can be used for this step. Example techniques for this purpose include, but are not limited to: using a finger to crop out an interesting session from a photo taken by the slave device of the master screen; a simple touch on the interesting session on the photo taken of the master screen; or other intuitive human gestures.

Triggering Mechanism: Upon the completion of interest indication, a human-gesture based triggering mechanism enables users to trigger the session migration in the most intuitive manner. Example triggering actions include, but are not limited to, shaking (or flipping, flicking) the slave device, pulling the slave device toward the user, or swinging the slave device to the left or the right.

Session Reestablishment: The selected session(s) from the master device will be established on the slave device. This migration is orchestrated by the digital cloudclone. The original session(s) can either terminate or continue on the master device, depending on the system configuration.

Figure 6:
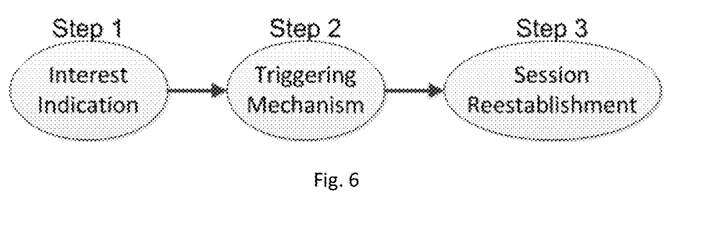
FIG. 6 illustrates the steps of a second session migration process.

FIG. 6 shows the transition diagram for backward migration. The generic flow from session migration from the slave device back to the master device includes four steps:

Interest Indication: When returning back the sessions from the slave device to the master device, the users are again allowed to choose one or more sessions to be migrated. Intuitive human-machine interfaces should be sought in this step, for example, checking a box associated with each session, or simply touching a migrated session.

Triggering Mechanism: Similar to the forward session migration, an event based triggering mechanism enables convenient session migration trigger from the users. For example, the user can literally "throw" the chosen session back to the master device. Other possible triggers actions include pushing the slave device away from the user and toward the master screen. It is also possible to use a voice command to trigger session migration.

Authentication: During the backward session migration, the migration request should contain the information about the ID of master device, which is obtained during the forward session migration. The according virtual machine will be configured to make ready to process the migration.

Session Reestablishment: Finally, the selected sessions will be terminated on the slave device. Simultaneously, this session is reestablished on the master device if it was previously terminated on the master device.

3.3 Session Migration Implementation

In this section, we describe a system which implements the session migration process described generically above.

Figure 7:
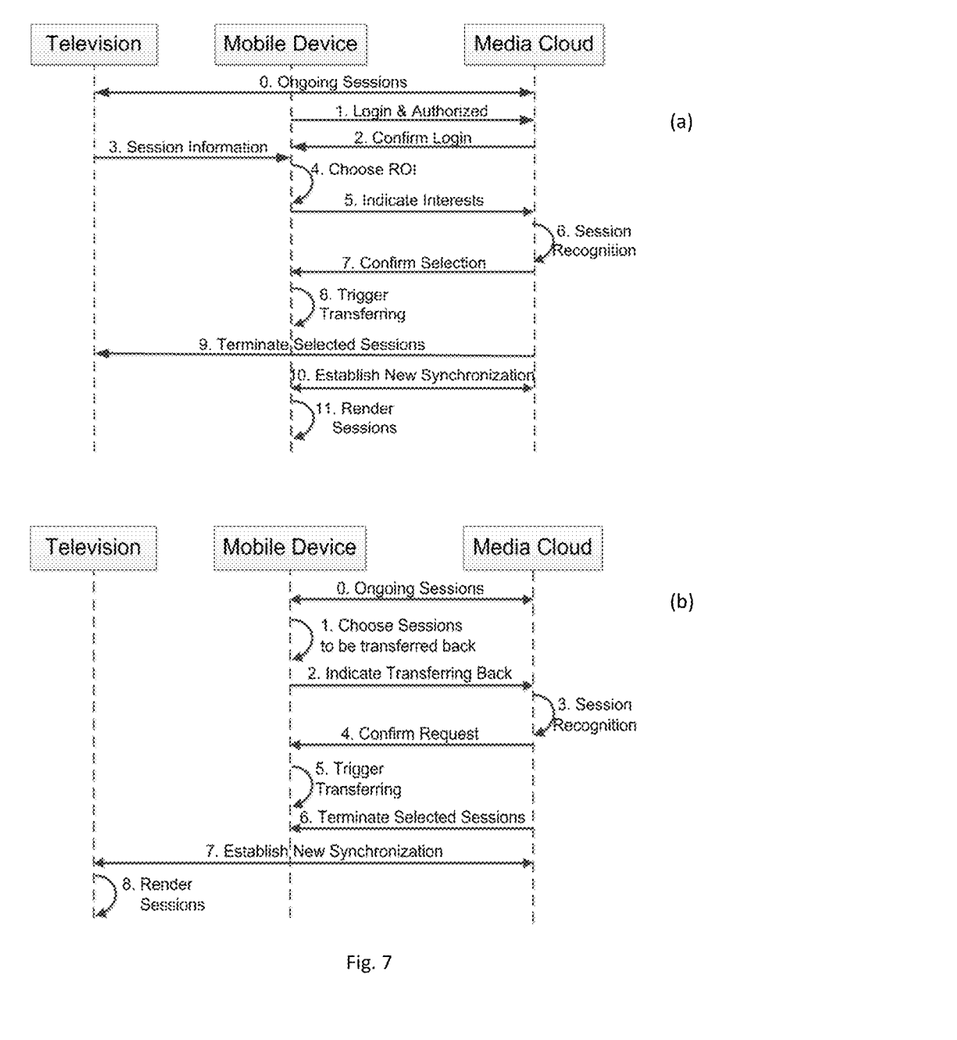
FIG. 7, which is composed of FIGS. 7(a) and 7(b), shows the steps of two session recognition and migration processes.

FIG. 7(a) illustrates the steps of the forward session migration process. Initially, we assume that one or more ongoing sessions are running on both the master device and its cloudclone (step 0 in FIG. 7(a)). To start a session migration, the user is required to log the slave device into the cloud to get authentication (step 1). Upon the confirmation (step 2), the session information on the master device is then sent to the slave device (step 3). Although for the sake of simplicity step 3 is illustrated as including a direct message from the Television to the mobile device, in fact all information flow is conducted via the cloudclone. In a variant of the embodiment, the application layer of the master and slave device operating system may include software such that no separate login authentication will be required.

The user of the slave device may indicate interest in one or more sessions running on the master device by choosing them. This is conveniently done by indicating a region of interest (ROI) (step 4). The ROI may be on the screen of the master device. Alternatively, if the slave device itself displays regions corresponding to the ongoing sessions (for example, the slave device may display an image of the screen of the master device), by selecting a region of interest on the slave device screen.

The user sends a session migration request via the user interface of the slave device to the cloud for the one or more selected sessions to be migrated via the user interface (step 5). Based on this request, the cloudclone will process to recognize the sessions (step 6) and send a message to the slave device seeking a confirmation (step 7). After the user receives this confirmation message, he/she can trigger the session migration (step 8). Finally, the selected sessions on the master device are either terminated or left to run concurrently on their own (step 9), and a new synchronization process is established between the slave device and the cloud to reestablish the selected sessions (step 10). The selected sessions then continue to run on the slave device (step 11).

FIG. 7(b) illustrates the implemented workflow of the backward session migration. Again, the figure assumes there are ongoing sessions running on both the slave devices and the corresponding cloudclone at the beginning (step 0). Again the user chooses a session (step 1), and sends an interest indication to the cloud (step 2). The cloud recognizes this (step 3), and sends a confirmation request (step 4). By the user giving this confirmation (step 5), the backward session migration can be triggered. Finally, the session reestablishment is processed: the session on the slave device is either terminated or left to run concurrently on its own (step 6), and the selected sessions are migrated back to the master device (step 7), where they continue to run (step 8).

4. Session Recognition and Migration

In this section, we discuss two processes, either or both of which may be carried out by the embodiment, to recognize sessions which are to be transferred. We also explain how the embodiment completes the session migration of Section 3.

Figure 8:
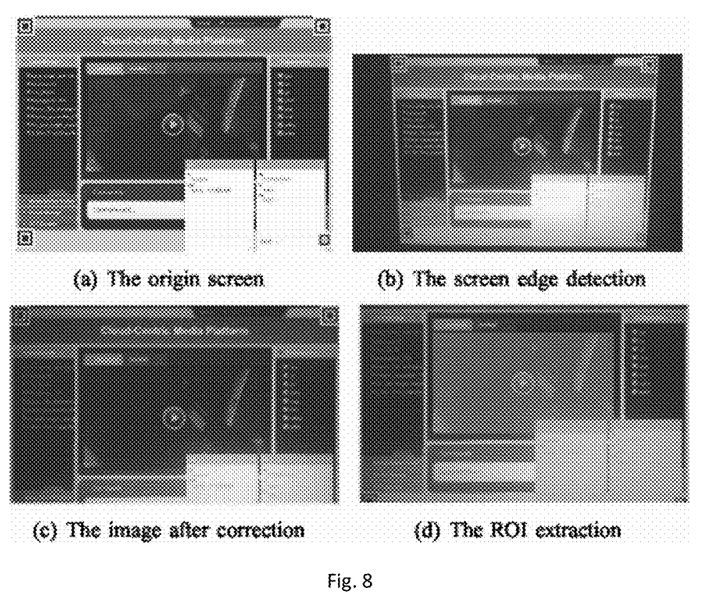
FIG. 8, which is composed of FIGS. 8(a)-(d), shows a process of selecting a session running on a first display device, for migration to a second device.

In a first of the two processes, it is assumed that the user wishes to perform a transfer such as the one illustrated in FIG. 4 and FIG. 7(a), and has for that purpose used a slave device with a camera to capture one or more images of the screen of a master device (the "origin screen"). The screen of the master device includes multiple areas corresponding respectively to multiple sessions running on the master device. An example of a possible origin screen is shown in FIG. 8(a), and the captured image is shown in FIG. 8(b). The captured image is then used to recognize one of the sessions, and initiate the migration.

There are four steps involved in the session recognition and migration: screen edge detection, image correction, region of interest (ROI) extraction, and session migration triggering. These steps are performed by the application in the slave device.

4.1 Screen Edge Detection

The captured images inevitably contain some surrounding information. The target of screen edge detection is to extract the real display zone. The screen edge detection relies on a set of assisted position markers which the origin screen is arranged to display. Inspired by the implementation of QR code, the embodiment places three position detection patterns on the left top, right top, and left bottom corner respectively, and one alignment marker on the right corner. These areas are the squares at the corners of FIG. 8(a).

It is assumed that the captured image of the origin screen is a colour image. If so, prior to applying the edge detection algorithm, the embodiment uses a thresholding method to turn the captured color image into a binary one, which is much easier to process, and the processing time can be shortened as well. Then the embodiment performs a scan line operation to find the position detection patterns and the alignment marker on the binary image. Specifically, according to the feature of those markers, the algorithm detects them by three steps. First, it tries to find 7 horizontal concessive pixels following 1:1:3:1:1 for position detection patterns (1:1:1:1:1 for alignment marker) in alternative black and white style in sequence, to determine a list of potential candidates. Second, the algorithm verifies those candidates by checking their vertical patterns. If some of them do not follow the same style, the embodiment filters them out of the candidate list. Finally, if the candidate list contains less than three position detection patterns, then the screen edge detection has to be re-conducted by automatically capturing a new image. Otherwise, if there are more than three candidates, the embodiment selects the most likely three by considering their expected coordinates.

4.2 Image Correction

Since the captured images usually suffer from distortion, rotation and offset, having the edge information is not enough to retrieve the image as shown in the main screen. An image correction algorithm is required to re-sharp the captured image. The embodiment uses an algorithm to do this which is based on a pinhole camera model and uses a camera matrix to correct the image by normalizing every coordinates. Specifically, in the pinhole camera model, we consider the mapping from the coordinates on the corrected image to the captured one, which can be given by, $$K = \begin{pmatrix} x \\ y \\ 1 \end{pmatrix} = \begin{pmatrix} a & b & c \\ d & e & f \\ g & h & 1 \end{pmatrix} \begin{pmatrix} i \\ j \\ 1 \end{pmatrix} = TL \quad (1)$$

where K refers the coordinate (x,y,1) on the desired image after correction, L is the coordinate (i,j,1) on the captured image, T is the camera matrix, standing for the projection from L to K. In T, a, b, c, d, e, f g, h are all constant parameters, which define each specific projection. By substituting L with the captured coordinates of the position detection patterns and alignment marker, and K with the corresponding coordinates of those marker after correction, we can determine all the constant parameters.

By multiplying both sides of Eqn. (1) by $T^{-1}$, we have, $$L = \begin{pmatrix} i \\ j \\ 1 \end{pmatrix} = T^{-1}K = \begin{pmatrix} a & b & c \\ d & e & f \\ g & h & 1 \end{pmatrix}^{-1} \begin{pmatrix} x \\ y \\ 1 \end{pmatrix}. \quad (2)$$

In this way, we can fill each single pixel (x,y,1) on the corrected image by finding the corresponding one (i,j,1) on the captured image. Notice that if the mapped coordinates i and j are non-integer, we adopt linear interpolation to calculate an approximate pixel based on the neighboring ones. FIG. 8(c) shows the image of FIG. 8(b) after the correction.

4.3 Extract Region of Interest

The extraction of region of interest (ROI) is a process to map the selected coordinate on the mobile device into the particular ongoing sessions. Specifically, the users are required to touch one or more interested sessions to be transferred on the corrected image via the touch screen. Then the selected coordinates of touch points will be sent to the media cloud to determine which sessions are to be transferred.

Due to the different screen size and resolution of different devices, the corrected image, which is displayed on the mobile device, may zoom in/out the origin image on the main screen with some offsets. As a result, we still have to re-size the captured image. Assuming the corrected image has been zoomed in for s times with an offset t $(t_x, t_y)$, we could map any of its point p (x, y) to the according one $P_0(x_0, y_0)$ on the main screen as, $$P_0 = (p-t)/s. \quad (3)$$

As a result, the media cloud calculates the real coordinates $P_0$ according to the touch points p sent from the mobile devices, and then the sessions can be determined. FIG. 8(d) shows the image of FIG. 8(c) with an extracted ROI highlighted.

4.4 Alternative Method of Session Selection

We now turn to the second process which may be used by the embodiment for selecting processes for transfer. In this alternative, the cloudclone is triggered (e.g. by a request from the slave device) to generate a synthetic image having areas representing sessions running on the master device, and transmitting the synthetic image to the slave device for display on the screen of the slave device. Using the synthetic image, the user can easily select an area of interest on the screen of the slave device, and input a command to cause the corresponding session to migrate to the slave device.

4.5 Session Transfer Trigger

Once a session has been selected for transfer using the process of steps 4.1-4.3 or step 4.4, a trigger mechanism is needed to inform the media cloud to fulfill it.

The most intuitive and comfortable way is for the user to perform a gesture which is a trigger. This can be implemented by taking advantage of an accelerometer or any other type of sensor which is provided in a mobile device. Specifically, the embodiment can capture gestures such as flipping in and out. Once such gestures are completed by the users, the session transfer is triggered. The media cloud can either maintain or terminate the ongoing sessions on the main screen, after transferring those sessions to the mobile device.

5. Video Redistribution Over Multi-Screen Cloud Social TV

We now turn to two applications of the embodiment of FIG. 1 which exploit the possibility of the cloudclone being able to employ pre-stored relationships (social network information) between users, such as being able to interact with a server which operates a social network. A first of these applications is to permit redistribution of videos, such as advertising material, between multiple users.

The embodiment can do this in three ways:

1) Synchronized video watching with remote friends. When a viewer is watching an video, such as an advertising video, on the multi-screen cloud social TV platform, he/she can share it with his/her online friends. As a result, they can watch the same video at the same pace, and have video/text chatting to discuss the playing advertisement at the same time.

2) Personalized TV station. A viewer can arrange a set of videos (including advertising videos and other media contents) into a personalized playing list. Then he/she can post this list to his social network. As a result, once his/her friends view this list, the videos will play in the order defined by the viewer. Thus, a personalized TV station experience is achieved.

3) Automatically posting videos, such as advertising videos, and related information to social networks. When a viewer is watching video on TV, he/she can transfer the ongoing video from TV screen to a mobile device by making a simple gesture (e.g., flipping the mobile device). Then the video as well as any related advertising information (e.g., commodity details, price, comments by others, and purchasing link, etc.) will show in the mobile device. Furthermore, this record may be automatically posted to this user's social networks. Thus, the advertising has been redistributed to his/her friend(s).

These three possibilities have several advantages over known systems for sharing videos such as advertising material:

1) Advanced User Experience. Users do not need to fulfill complicated operations to redistribute advertisements. All the intelligence is hidden in the cloud.

2) The technique fully takes advantage of social network information. Users only redistribute the advertisements to their friends, who they think will be probably interested in those contents. This scheme can help to improve the advertising effectiveness.

3) Scalability and Flexibility. Since the embodiment uses cloud computing technology, the advertisement redistribution application can be scalable and flexible when the number of user requests goes up and down.

Figure 9:
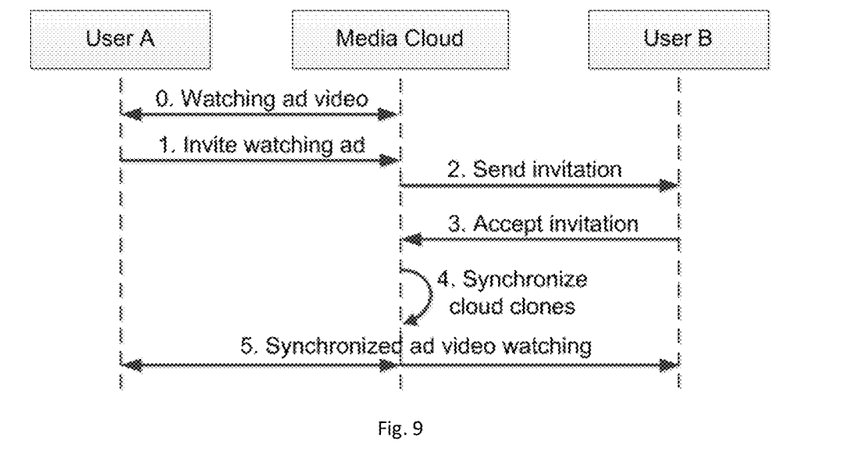
FIG. 9 shows the steps of a method for synchronized advertising video watching, performed by the embodiment.

FIG. 9 shows how watching of video (such as an advertising video) can be synchronized between users of the embodiment. Let us assume that there are two users: User A and User B who have a predefined relationship (they are "friends"). It is also assumed that they are both online when the process of FIG. 8 commences. User A is watching a video, such as an advertising video ("step 0"), and he/she wants to share it with User B.

Step 1. To start this synchronized advertising video watching, user A should first send an invitation to user B via the media cloud.

Step 2. The media cloud forwards the invitation to User B.

Step 3. User B accepts/declines this invitation.

Step 4. After User B accepts the invitation, the media cloud will synchronize the two cloudclones to make them have the same session information (e.g., video playing).

Step 5. Both User A and User B are watching the same thing at the same pace. Since User A is the initiator, he/she can control the video playing (e.g., pause, forward, and backward), while User B always have the same view, because their cloudclones are synchronized in the cloud.

Figure 10:
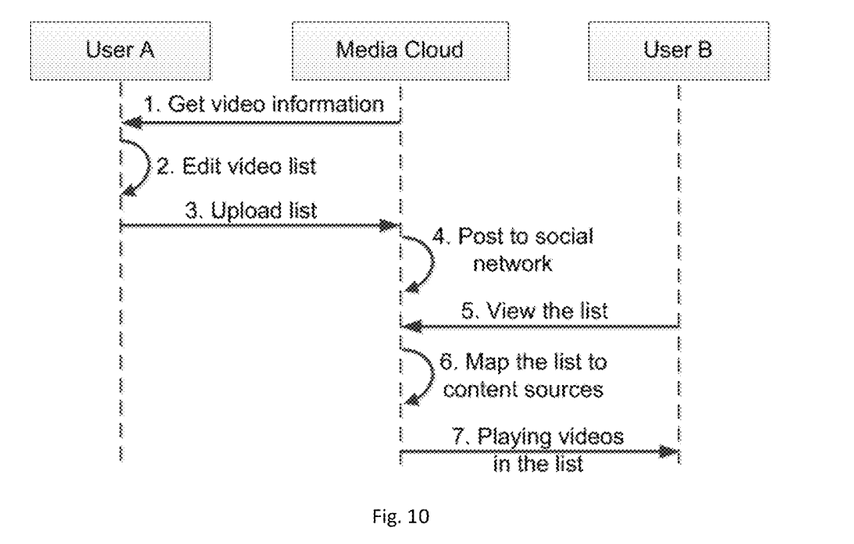
FIG. 10 shows the steps of a method for delivering a personalized TV station experience, performed by the embodiment.

FIG. 10 shows how the embodiment can be used to produce a personalized TV station experience. Let us assume that User A wants to share a few videos with his/her friend, User B.

Step 1. User A first obtains video information (e.g., video name, introductions, etc.) from the media cloud.

Step 2. User A can pick some of those videos, and arrange them into a personalized list in any order.

Step 3. User A uploads this list to the media cloud.

Step 4. The cloud posts this list to the user's social network, so that all his/her friends can view it.

Step 5. One of User A's friends, User B, wants to watch the listed videos, and sends a viewing request to the media cloud.

Step 6. The cloud automatically maps this list to those corresponding content sources.

Step 7. The cloud streams the videos to User B.

In this way, User A creates a personalized TV station, and those listed videos are redistributed to User B.

Figure 11:
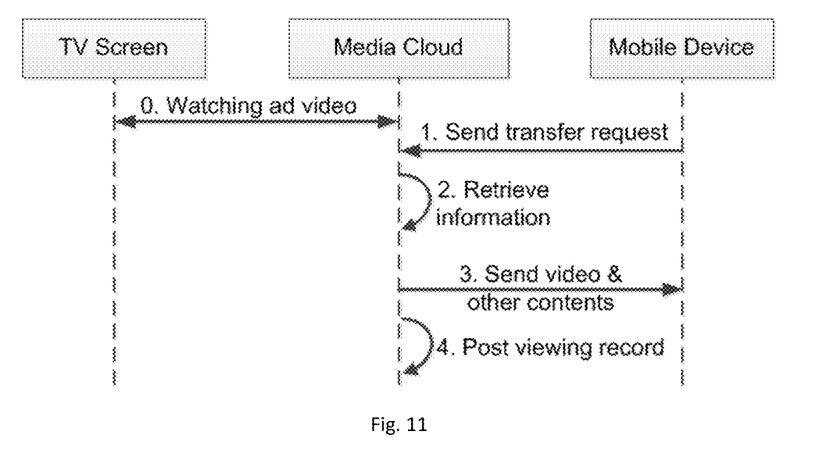
FIG. 11 shows the steps of a method for automatic advertising data posting, performed by the embodiment.

FIG. 11 shows how the embodiment can be used to produce automatic advertising data posting. Assume that one user is watching advertising video on a TV screen, and he/she wants to find more details (e.g., price, purchasing link, comments, etc.) about this advertisement by using a mobile device.

Step 1. The user may use any mobile device (e.g., mobile phone, tablet) to request a transfer of the ongoing sessions from the TV screen to the mobile device.

Step 2. After the media cloud receives the transfer request, it will retrieve the related information about the playing advertising video.

Step 3. When all the information is retrieved, it will be sent to the mobile device.

Step 4. At the same time, the cloudclone may also automatically post this viewing record to the user's social network.

6. Sharing a Composite Media Objects Using Social Networks

A second application of the embodiment of FIG. 1 which exploits the possibility of the cloudclone being able to employ pre-stored relationships (social network information) between users, is to use it to generate a composite medial object ("synthesis image") and share it shared based on those relationships.

The key idea is that when a viewer is watching a TV program in front of the TV screen, he/she can collect the current real-time video frame from TV screen to mobile device by performing a simple gesture (e.g., flipping the mobile device). The viewer can choose to collect a number of images as the ongoing TV program is playing. When he/she has finished the collection, those images will be automatically synthesize into a new one (the synthesis object) according to some pattern. Finally, the synthesis image will be posted to the viewer's social networking website.

This approach has the following advantages:

1) Advanced User Experience. Users do not need to fulfill complicated operations to post synthesis images based on real-time TV programs. All the intelligence is hidden in the cloud. Users can just focus on the contents.

2) Scalability and Flexibility. Since the embodiment uses cloud computing technology, the application can be scalable and flexible when the number of user requests goes up and down.

Figure 12:
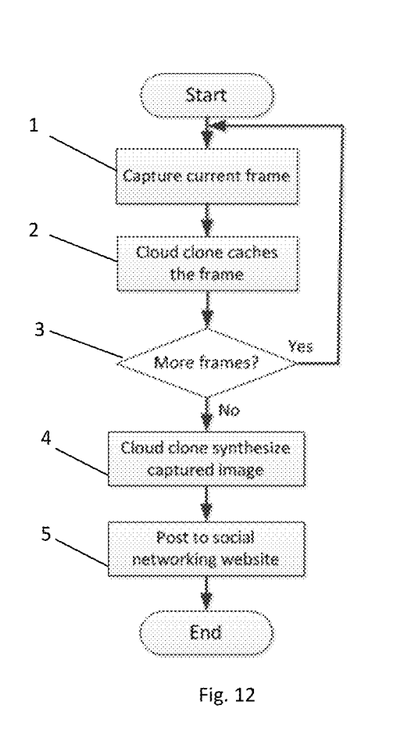
FIG. 12 shows the steps of a process carried out by the embodiment for creating a synthesis image for social networks.

FIG. 12 shows the steps of the method for creating and sharing the synthesis image using a social network. Assuming a user is initially watching TV programs in front of a TV screen, and he/she wants to share some chosen frames of the playing program with his/her friends. In this case, the method works as follows.

Step 1. The user sends a frame capture request to the user's cloudclone by flipping a mobile device which is connected to the cloudclone.

Step 2. Upon receiving the user request, the cloudclone will cache the current frame of the playing program, and send it to the user's mobile device.

Step 3. The user needs to decide whether to capture more frames. If yes, go to step 1,otherwise, go to step 4.

Step 4. The cloudclone synthesizes the set of captured images into a new one, according to any user defined pattern.

Step 5. The synthesis image is automatically posted to the social networking websites, by using the associated account.

7. Front-End User Features

Figure 13:
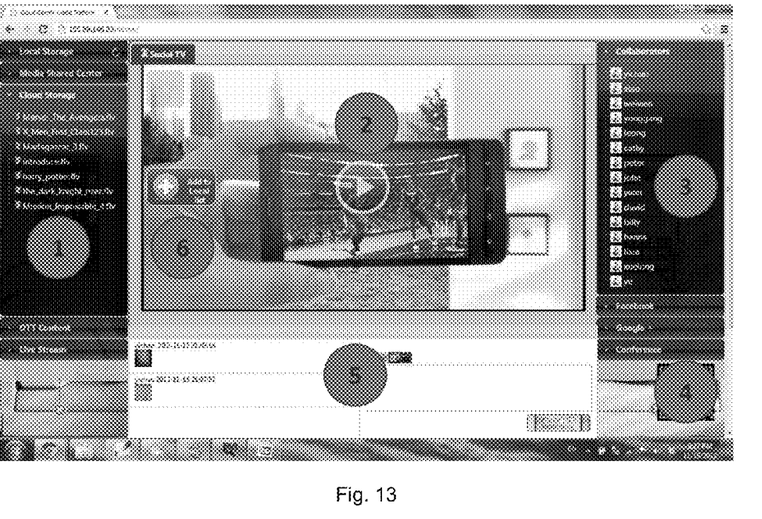
FIG. 13 shows a graphical user interface (GUI) for use by one of the display devices of the embodiment.

We illustrate the set of front-end user features via the schematic web GUI in FIG. 13 which is generated by one of the display devices of FIG. 1. The GUI permits the user to perform the following functions, using the areas of the GUI which are labeled in FIG. 13 by the corresponding numbers:

1) Content acquisition from diverse sources: the system will provide a "one-button" method, with flexible configuration capability, for consumers to acquire video contents from different sources, including local DVRs, OTT content portals (e.g., Youtube), shared resources from friend/family, and live TV streams. In this system, the content, once acquired from its original source, is stored securely in the cloud.

2) Adaptive video streaming player: the video playback feature has self-adjusting capability to match the conditions in the network, screen size, content format, and user preference. This feature enables better QoE for the consumers, in a changing environment. For example, the video quality can be adjusted in response to the wireless channel condition, minimizing the probability of freezing frames.

3) Communication by text, voice and video over private and public social networking: the prototype will provide this function for the end users to communicate their friends from both private group and public social networking profiles, while watching the video clip. In addition to the PIP (Picture in Picture) composition as provided by other social TV applications, the embodiment uses the video session migration feature to allow the user to migrate the communication session from the TV screen to other devices (smartphone, tablet, etc) to best explore the interaction capability of these smaller screens, thus offering a better QoE to ease user adoption and increase user stickiness.

4) Video session migration enables the viewers to migrate video sessions across multiple screens with intuitive HCI techniques, minimizing the learning process.

5) User metadata for contents: Making interactive marketing real time is another significant value proposition. The system allows the users to insert comments (e.g., text, voice, picture, video) associated with the video clip in different time stamps. These user generated contents will be published along the video of focus for community consumption. These UGCs can be used for example, to mine social-directed content commendation, ad insertion, and marketing research and feedback, etc.

6) Collaborative content overlay: the system allows multiple viewers to edit the video clip on the main screen with additional content overlay. These changes are published associated with the main content for differentiated consumption. One application of this feature is enabling multiple-user video editing remotely, making it possible to engage the power of a global team without the associated cost of distance. Online e-learning is another potential application of this feature.

The invention claimed is:

1. An apparatus comprising a plurality of independent physical computer systems arranged to cooperate to implement a virtual computer system,
the virtual computer system being arranged to communicate with multiple video display devices each of which has at least one screen, the video display devices having predefined relationships with a plurality of users whereby each of the users is associated with a respective sub-set of the display devices, and at least one of the respective sub-sets of display devices comprises a plurality of display devices;
the virtual computer system being arranged to communicate with a plurality of databases storing media content, and to deliver the media content selectively to the video display devices,
the virtual computer system being arranged to perform, for each said user, a respective process referred to as a cloudclone,
each cloudclone including:
respective threads for each of the corresponding sub-set of video display devices, which manage the transfer of media content to the corresponding sub-set of video display devices;
one or more applications which obtain media content from at least one of the databases; and
an inter device message bus which transfers content from the one or more applications selectively to the threads.

2. An apparatus according to claim 1 for which, when for one or more of said users there are a plurality of said display devices in the corresponding sub-sets of display devices, each of the corresponding cloudclones run a respective computing thread for each of the display devices in the respective sub-set of display devices, each of the threads mimicking processes running on the corresponding display device.

3. An apparatus according to claim 1 in which each of the cloudclones is performed by a respective sub-set of the plurality of independent computer systems which are associated pairwise by key data contained in the cloudclone, and which include computer systems which communicate with the corresponding sub-set of display devices.

4. An apparatus according to claim 1 in which the key data for each cloudclone associates the respective sub-set of the independent computer systems as a respective distributed-hash-table ring.

5. An apparatus according to claim 1 in which the virtual computer system is arranged to operate as a plurality of layers, comprising:
a media cloud infrastructure layer;
a media service platform, relying upon the media cloud infrastructure layer, and comprising a library of tools;
a media application layer, relying upon the media service platform, and providing services visible to the users.

6. An apparatus according to any preceding claim which is operative to modify any of said cloudclones to add a new display device to the corresponding sub-set of display devices, by initiating a corresponding thread within the cloudclone.

7. An apparatus according to any preceding claim which is operative, when the message bus of a cloudclone is streaming content to a first of the corresponding sub-set of display devices, to perform a first session migration operation of modifying the operation of the message bus to begin to stream the content to a second of the sub-set of display devices.

8. An apparatus according to claim 7 in which during the first session migration operation, the streaming of the content to the first display device is interrupted;
the apparatus further being operative to perform a second session migration operation in which the apparatus ceases streaming the content to the second display device, and recommences transmission to the first display device.

9. An apparatus according to claim 7 which is operative to simultaneously stream multiple sessions to the first display device for simultaneous display in respective regions of the screen of the first display device, and to transfer a selected one of the session to the second device in the first session migration operation.

10. An apparatus according to claim 9 in which the second display device is configured to display on its screen an image including a plurality of regions, the regions corresponding to the respective sessions on the first display device, and the selection is by selection of the corresponding region of the screen.

11. An apparatus according to claim 10 in which the image is obtained by image capture from the screen of the first display device.

12. An apparatus according to claim 10 in which the image is generated by the virtual computer system based on data in the cloudclone.

13. An apparatus according to any of claims 7-12 in which the virtual computing system receives a trigger for one of the session migration operations in the form of a signal indicative of motion of one of the display devices.

14. An apparatus according to any preceding claim wherein each cloudclone includes one or more applications,
each application being associated with one or more of the corresponding sub-set of display devices, mimicking an application running on the one or more display devices, and controlling the presentation of content on the one or more display devices.

15. An apparatus according to any preceding claim in which the cloudclone is operative to access predefined social data which for each of first ones of the users defines a corresponding set of second ones of the users;
the apparatus being operative based on actions by each first user to modify media content delivered to at least one of the display devices associated with the corresponding set of second users.

16. An apparatus according to claim 15 in which is operative to modify the cloudclones of the second users to receive a video stream which is selected by the first user and simultaneously streamed to the first user.

17. An apparatus according to claim 15 in which is operative to modify the cloudclones of the second users to receive a video stream which is pre-selected by the first user.

18. An apparatus according to claim 15 which is operative to receive from each first user a selection of images from content streamed to the first user, and to make the selected images available to the corresponding set of second users.

19. An apparatus according to any of claims 15-18 which is operative to receive text input from the first user, and display the text input to the second users.

20. A method for performance by a plurality of independent computer systems arranged to cooperate to implement a virtual computer system, to deliver media content to multiple video display devices each of which has at least one screen, the video display devices having predefined relationships with a plurality of users whereby each of the users is associated with a respective sub-set of the display devices, and at least one of the respective sub-sets of display devices comprises a plurality of display devices;
> the method including performing, for each said user, a respective process referred to as a cloudclone;
> each cloudclone including:
> respective threads for each of the corresponding sub-set of video display devices, which manage the transfer of media content to the corresponding sub-set of video display devices;
> one or more applications which obtain media content from at least one content database; and
> an interdevice message bus which transfers content from the one or more applications selectively to the threads.

21. A method according to claim 20 further including modifying the message bus thereby causing video which is being streamed to a first of the corresponding sub-set of display devices to be streamed to a second of the corresponding sub-set of display devices.

* * * * *